Patented Dec. 15, 1931

1,836,211

UNITED STATES PATENT OFFICE

HENRY J. WEILAND AND IVAN GUBELMANN, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

SEPARATION OF ALPHA MONO SUBSTITUTED NAPHTHALENES FROM THEIR BETA ISOMERS

No Drawing.    Application filed February 6, 1928.    Serial No. 252,419.

This invention relates to a process of purifying organic bodies of the naphthalene series and more particularly to a process of isolating in substantially pure form a naphthalene derivative substituted in the alpha position from a mixture containing besides the alpha substituted naphthalene, appreciable amounts of the isomeric beta substituted naphthalene and a small amount of other impurities.

The organic bodies coming within the scope of this invention include mono-substituted naphthalenes, such as alpha and beta nitro naphthalene and alpha and beta naphthylamine.

It is an object of this invention to provide an economically practical method for the preparation of substantially pure alpha nitro naphthalene and substantially pure alpha naphthylamine, said method comprising the separation in substantially pure form in a novel way of each of the said compounds from technical products, namely, crude alpha nitro naphthalene and crude alpha naphthylamine.

It is to be understood that if the desired product is alpha naphthylamine, then either the crude alpha nitro naphthalene may be purified to give a purified alpha nitro naphthalene, which may be reduced to substantially pure alpha naphthylamine; or the crude alpha nitro naphthalene may be reduced to give a crude alpha naphthylamine, which may then be purified to the substantially pure form.

In the use of the term "crude nitro naphthalene" and "crude alpha naphthylamine", we mean to designate the crude products in the obtaining of which no attempt has been made to separate the beta isomer.

It is a well known fact that technical alpha naphthylamine contains appreciable quantities of beta naphthylamine. Although the step of fractionally distilling either the crude nitro naphthalene or the crude alpha naphthylamine may accomplish a certain amount of purification, it has not been found effective in substantially lowering the "beta" content.

The heretofore known methods of preparing alpha naphthylamine in a substantially pure form, that is practically free from beta naphthylamine, have employed the step of crystallizing the crude alpha naphthylamine to remove the "beta" by the use of an added solvent, said solvent being of a nature which will dissolve not only the beta naphthylamine but also large amounts of the desired product, alpha naphthylamine (see British Patent No. 16,446 of 1907). In a recent patent, namely U. S. Patent 1,581,258, there is described a method for the purification of alpha nitro naphthalene by recrystallizing the crude nitro naphthalene from organic solvents such as solvent naphtha, petroleum ether, benzene, toluene and turpentine.

It is to be noted, in the most recent literature on the purification of either crude alpha nitro naphthalene or crude alpha naphthylamine, that there is employed an added organic solvent, which acts as a ready solvent not only for the beta isomer, but also for the alpha isomer. The use of such solvents results in lower yields of the desired product.

It is to be further noted that in the above disclosed method, there are employed at least two distinct types of apparatus for the purification; namely, one type to perform the actual crystallization and another to remove the solvent containing the dissolved impurities, an example of the latter type being a centrifuge or hydroextractor. In addition to these two sets of apparatus, there is also required some form of apparatus for the recovery of the solvent used. Consequently, the use of a solvent and additional apparatus entails certain unnecessary steps, solvent losses and the like which according to our present invention may be eliminated, whereby we are able to effect a more economical recovery of the desired product at a considerable saving in cost of apparatus, in upkeep and in labor.

It is generally known, that upon cooling a liquid system composed principally of two chemical isomers, each having definite melting points in the pure state, provided the isomers do not crystallize in such a manner as to form mixed crystals, there results at first a crystallization of a single isomer in pure form. The crystallization of the single isomer will continue upon cooling the system until a certain point is reached, known as the eutectic point. If cooling is continued below the eutectic point, the eutectic mixture will crystallize. Eutectic point is here used in the usual accepted sense as meaning the lowest temperature to which a mixture of two or more crystalline components may be cooled without effecting the crystallization of a mixture of the components. The mother liquor remaining liquid at the eutectic temperature is here referred to as the eutectic liquor. It therefore follows that at the eutectic point the eutectic liquor is incapable of dissolving any of the components of the system and has a definite composition. However, if the temperature of the system is raised above the eutectic point, the eutectic liquor then acts as a solvent for the component present in the system in crystal form.

In the system of isomers under consideration, if the liquid portion be drained off at the eutectic point, the liquid system is in such a state of equilibrium that the introduction of either of the pure isomers will raise the melting point; or conversely, the eutectic liquor, that is, the portion separated from the partially crystallized system at the eutectic temperature will not act as a solvent for either of the pure isomers at the eutectic temperature, since it is saturated with respect to both isomers at the eutectic point. Therefore, the specific problem to effect purification is the removal of this eutectic liquor.

The complete removal of the eutectic liquor becomes difficult of accomplishment at or about the eutectic point for the reason that the eutectic liquor tends strongly to adhere to the crystals and to be retained in the crystal mass by capillary action. If, however, the temperature is raised above the eutectic point, the eutectic liquor then acts as a solvent to dissolve some of the crystals and form a liquor richer in one of the components, namely the desired component. The result is that less of the desired component is obtained in crystal form but a larger proportion of the eutectic liquor can be readily drained off of the crystals.

Instead of simply draining off the eutectic liquor by gravity and displacement thereof by eutectic liquor richer in the desired component, suction may be applied or air forced through the crystal mass to displace the eutectic liquor. Water may likewise be used in place of, or in addition to air, as the displacing medium.

Furthermore, since upon cooling a system as described above there results the crystallization of a single pure isomer down to a certain point, namely the eutectic point, it appears to us therefore to be highly disadvantageous to add to the system a solvent, more particularly such solvents as are described in hitherto disclosed methods which act as ready solvents for both isomers. For by adding a solvent, there results not only a solution of the impurity but a solution of the desired product, thereby lowering the yield of the desired product.

In our process, however, the enriched liquor, after the true eutectic liquor has been largely drawn off at the eutectic point, is separately drawn off and can be directly reused in subsequent operations, whereby loss of the desired product is largely eliminated. This is not the case where external solvents are used, since there the external solvents must be separately recovered.

It is to be noted here that the above statements refer strictly to ideal cases wherein there are only two constitutents or isomers, as for example, beta nitro naphthalene and alpha nitro naphthalene. However, in the manufacturing processes on a large scale, there are usually present small quantities of other constituents, as for example, small amounts of naphthalene. In these cases, the above statements do not hold strictly true, but for all practical purposes may be regarded as being sufficiently exact to bring about desirable results. Satisfactory results may nevertheless be realized, using our process, where naphthalene is present in the system in considerable amount, as where an appreciable excess of naphthalene remains in the nitration mass.

The solution of the problem of purification, therefore, resides first in the cooling of the molten mixture, say of beta naphthylamine and alpha naphthylamine, as it is usually obtained in the crude state by the reduction of crude alpha nitro naphthalene, to a minimum temperature under very closely regulated conditions of cooling in order to obtain the crystals of the desired product, alpha naphthylamine, in maximum amount; secondly in the obtaining of the crystals in such a physical form that the liquid impurities may be advantageously removed from the crystals; and thirdly, in removing the liquid impurities in a practical manner.

These conditions are most advantageously met by placing the molten mass containing the desired product and the impurities to be removed in a tank equipped with coils set at close intervals to one another throughout the tank. Through these coils is circulated a medium, the temperature being controlled by a thermostat and a heating unit capable of maintaining the temperature within $\frac{1}{2}°$ C. of the desired point. In order to form crystals of good physical form, it is advantageous not to agitate them during the step of crystallizing. The liquid impurities which gravitate to the bottom of the tank are removed by simply draining or by draining and suction. Working under these conditions, the desired product is crystallized out with maximum efficiency and the impurities are for the most part present in the liquid state. The product which has been simply drained of the liquid impurities has been found to be sufficiently pure for many uses, but in order to obtain products of the highest purity, it is necessary to displace the remaining liquid impurities as by suction, air pressure or water.

After displacing the liquid impurities from the crystals as outlined, followed by complete melting and a distillation for cleansing purposes, we have been able to purify crude alpha nitro naphthalene on a large scale to a melting point of 55° C., as compared to 56.3° C. for very highly purified material prepared in the laboratory, and alpha naphthylamine from the crude naphthylamine to a melting point of 48.0 to 48.3° C., as compared to 48.7° C. for very highly puprified material prepared in the laboratory. Products of this high purity have been found very satisfactory for use in the preparation of other intermediates and dyestuffs.

It is to be noted in our improved process that the actual crystals are not transferred to another piece of apparatus for the removal of the liquid impurities, thus eliminating the step of handling and contact with the materials, which are more or less toxic. It is likewise to be noted that no solvents are necessary to effect good crystallization.

The basis of this invention resides in the fact that beautiful crystallization results by crystallizing without agitation by means of a very highly regulated method of cooling to form crystals of such physical form that the liquid impurities may be drained without transfer of the crystals from the crystallizer, as for example, to a centrifuge or a filter press. It is further to be noted that in either of these specific systems, namely, alpha and beta nitro naphthalene and alpha and beta naphthylamine, a regulated system of cooling is not absolutely necessary since the point to which the system must be cooled is around room or average temperature, and that the cooling may be effected by simply allowing the tank to cool down by open air cooling. This latter method is not to be preferred since the time factor enters in and the variation in temperature due to climatic changes is not dependable.

Without limiting our invention to any particular procedure, the following examples will serve to illustrate our method in its preferred form.

*Example I*

Molten crude alpha nitro naphthalene, crystallizing point 50° C., is charged into the crystallizer. The cooling water is then run through the coils at about 47° C. The temperature of the cooling water is gradually lowered to about 20° C. over a period of about 24 hours. This temperature is maintained until equilibrium is reached in the liquid-crystal system. A valve is then opened on the bottom of the crystallizer and the liquid portion drawn off by simply draining and finally by applying suction. The temperature in the coils is then slowly raised to about 50° C. and at the same time the liquefied portion drained off. When the flow has practically stopped, the valve on the bottom of the crystallizer is closed and the crystals melted. The alpha nitro naphthalene thus purified has a crystallizing point of 54.5° C. on the dry basis, or 55° C. after vacuum distilling.

*Example II*

Molten crude alpha naphthylamine with a crystallizing point of 44 to 45° C. is charged into a crystallizer. Cooling water is run through coils in the crystallizer at an initial temperature of 40° C. This temperature is gradually lowered over a period of 24 hours to 27° C. This latter temperature is maintained on the cooling coils until the liquid portion in the crystallizer has dropped to 28° C. A valve is then opened on the bottom of the crystallizer and the mother liquor is drained out, at first by gravity and finally with suction. When the flow has practically ceased, water is again circulated in the coils causing the temperature of the mass in the crystallizer to rise over a period of about 24 hours to 46° C. During the reheating of the batch, suction is applied at all times so that any liquid material present is removed. The valve is now closed and the crystals of alpha naphthylamine in the crystallizer are melted. After a distillation for cleansing purposes, the refined alpha naphthylamine has a melting point of 48° C. or above.

*Example III*

The crystallization and draining is carried out in a manner similar to that described in Example 1. The displacement of liquid in practice is performed by passing water through the mass of the crystals increasing the temperature of the water up to about 50° C. and continuing at the temperature until practically all oily products are removed.

It is to be understood that the temperature employed in the final cooling of either of these specific systems, namely, alpha nitro naphthalene-beta nitro naphthalene, and alpha naphthylamine-beta naphthylamine may be varied slightly to bring about similar results as above. In case a third component is present in the system, as for instance naphthalene, it is necessary to cool correspondingly lower to minimize the loss of the desired product. We are also aware, since the eutectic point of the two systems lies close to ordinary temperature, that purification may be had by using as cooling means only the external cooling of the outside air. The basis for this invention is found in the statement of the principle, namely, the cooling of the specific mixture without agitating to a point approaching the eutectic point to effect maximum crystallization in a desirable physical form and the removal of the liquid impurities by gravity and positive displacement at as low a temperature as is possible.

It should be further noted that as an alternative procedure, practically the entire system including the pure compound and the eutectic liquor may be frozen practically solid and the eutectic liquor be reformed by slowly bringing the temperature back to the eutectic point.

Obviously the ideal practice for maximum recovery would be to draw off the liquid portion at the eutectic point. However, when there is a third component present (say, naphthalene) the eutectic point of the mixture may be so low as to make it impractical to cool to that temperature. Thus if it were attempted to bring the temperature in Example I down to the actual eutectic temperature of the particular mixture used as starting material in this example, the cost of the cooling would probably be doubled or trebled while the additional percentage of alpha isomer recovered would be very small as compared to the percentage already recovered. Therefore it should be understood that by the term "temperature slightly above the eutectic point" as used in the claims is meant a temperature sufficiently above the eutectic point of the system to permit an economical recovery of the alpha component.

We are aware that numerous details of the process may be varied through a wide range without departing from the principles of this invention, and we, therefore, do not purpose limiting the patent granted hereon otherwise than necessitated by the prior art.

We claim as our invention:

1. In the process of isolating a substantially pure alpha mono substituted naphthalene from a mixture containing principally alpha and beta isomerically substituted naphthalenes, the alpha component being present in excess of its proportion in a eutectic mixture of the two components, the steps which comprise slowly bringing said mixture without agitation to a temperature slightly above the eutectic point and removing portions of the mixture that are liquid at that temperature.

2. In the process of isolating a substantially pure alpha mono substituted naphthalene from a mixture containing principally alpha and beta isomerically substituted naphthalenes, the alpha component being present in excess of its proportion in a eutectic mixture of the two components, the steps which comprise cooling the mixture from molten condition to a temperature slightly above the eutectic point without agitation and removing portions of the mixture that are liquid at that temperature by gravity and positive displacement by a fluid medium which is substantially immiscible with the desired component under the conditions obtaining.

3. In the process of isolating a substantially pure alpha mono substituted naphthalene from a crude mixture containing principally the alpha body and a relatively small proportion of the isomeric beta body, the steps which comprise slowly cooling the mixture from a molten condition without agitation to a temperature slightly above the eutectic point and removing by gravity portions of the mixture liquid at that temperature.

4. In the process of isolating a substantially pure alpha mono substituted naphthalene from a mixture containing principally alpha and beta isomerically substituted naphthalenes, the alpha component being present in excess of its proportion in a eutectic mixture of the two components, the steps which comprise slowly bringing said mixture without agitation to a temperature slightly above the eutectic point, removing portions of the mixture that are liquid at that temperature, gradually heating the remaining mass to a temperature below the melting point under the conditions for obtaining the pure alpha substituted naphthalene and continuously removing those portions of the mass that are liquid during the heating up stage.

5. In the process of isolating a substantially pure alpha mono substituted naphthalene from a mixture containing principally alpha and beta isomerically substituted naphthalenes, the alpha component being present in excess of its proportion in a eutectic mixture of the two components, the steps which comprise slowly bringing said mixture without agitation to a temperature slightly above the eutectic point, removing portions of the mixture that are liquid at that temperature, gradually heating the remaining mass to a temperature below the melting point under the conditions for obtaining the pure alpha substituted naphthalene and continuously displacing by means of a fluid medium which is substantially immiscible with the desired component under the conditions for obtaining those portions of the mass that are liquid during the heating up stage.

6. The process of isolating a substantially pure alpha mono substituted naphthalene from a crude mixture containing principally the alpha body and a relatively small proportion of the isomeric beta body, which comprises slowly cooling said mixture without agitation from a molten condition to a temperature slightly above the eutectic point, removing the then liquid portion by gravity, slowly heating the remaining mass to a temperature below the melting point under the conditions for obtaining the alpha body and continuously displacing by means of a fluid medium which is substantially immiscible with the desired component under the conditions for obtaining those portions of the mass that are liquid during the heating up stage.

7. The process of obtaining substantially pure alpha naphthylamine from a crude alpha naphthylamine mass containing some beta naphthylamine, the alpha component being present in excess of its proportion in a eutectic mixture of the two components, which comprises slowly cooling the mass from the molten state without agitation to a temperature slightly above the eutectic point, removing those portions of the mass that are liquid at that temperature, slowly heating the remaining mass to a temperature slightly below the melting point under the conditions for obtaining pure alpha naphthylamine and continuously removing those portions of the mass that are liquid during the heating stage.

8. The process of obtaining substantially pure alpha naphthylamine from a crude alpha naphthylamine mass containing some beta naphthylamine, the alpha component being present in excess of its proportion in a eutectic mixture of the two components, which comprises slowly cooling the mass without agitation to a temperature of about 28° C., removing by gravity those portions of the mass that are liquid at that temperature, slowly heating the remaining mass to a temperature of about 46° C., and continuously removing by gravity those portions of the mass that are liquid during the heating stage.

9. The process of obtaining substantially pure alpha naphthylamine from a crude alpha naphthylamine mass containing some beta naphthylamine, the alpha component being present in excess of its proportion in a eutectic mixture of the two components, which comprises gradually cooling the mass under regulated conditions but without agitation from a molten condition to a temperature of about 28° C., removing those portions of the mass that are liquid at that temperature by draining and by applying suction to the mass, slowly heating the remaining mass to about 46° C. and simultaneously applying suction to the mass to remove liquid portions therefrom.

10. In the process of obtaining substantially pure alpha naphthylamine from a crude alpha naphthylamine mass containing some beta naphthylamine, the alpha component being present in excess of it proportion in a eutectic mixture of the two components, the steps which comprise gradually cooling the mass from the molten condition without agitation to a temperature of about 28° C. and removing by gravity those portions of the mass that are liquid at that temperature.

11. In the process of obtaining substantially pure alpha naphthylamine from a crude alpha naphthylamine mass containing some beta naphthylamine, the alpha component being present in excess of its proportion in a eutectic mixture of the two components, the steps which comprise gradually cooling the mass from the molten condition without agitation to a temperature slightly above the eutectic point and removing by gravity those portions of the mass that are liquid at that temperature.

12. The process of obtaining an alpha mono-substituted naphthalene in substantially pure form from a mixture composed principally of alpha and beta isomerically mono-substituted naphthalenes, the alpha component being present in a higher than eutectic proportion, which comprises bringing the mixture to a temperature slightly above the eutectic temperature of the mixture, whereby the alpha component is present in solid form in equilibrium with a liquid phase, largely separating the liquid phase from the solid by gravity and recovering said solid alpha component substantially free from adhering liquid containing the undesired component, the entire process being carried out in the absence of mechanical agitation.

13. The process of obtaining an alpha mono-substituted naphthalene in substantially pure form from a mixture comprised mainly of alpha and beta isomerically mono-substituted naphthalenes and impurities and in which the alpha component is present in a higher than eutectic proportion, which comprises the steps of bringing the entire system to equilibrium at a temperature at which the greater part of the alpha component is present in solid phase while all of the beta component and impurities present are in liquid phase, separating by gravity the liquid phase from the solid, and recovering said solid phase substantially free from any adhering liquid containing the undesired component, the entire procedure being carried out under conditions excluding mechanical agitation.

14. The process of obtaining an alpha mono-substituted naphthalene in substantially pure form from a mixture comprised mainly of alpha and beta isomerically mono-substituted naphthalenes and impurities and in which the ratio of the alpha to the beta component is higher than the eutectic ratio, which comprises the steps of bringing the entire system to equilibrium at a temperature at which the system resolves itself into two phases, one of said phases being liquid and containing all of the beta component and impurities and the other of said phases being solid and comprising a substantial quantity of the alpha component only, separating by gravity the liquid phase from the solid phase, the entire procedure being carried out under conditions excluding mechanical agitation whereby the solid phase is formed in a physical state favoring the separation of the liquid phase by gravity.

15. The process of obtaining substantially pure alpha nitro naphthalene from a crude alpha nitro naphthalene mass containing some beta nitro naphthalene, the alpha component being present in excess of its proportion in a eutectic mixture of the two components, which comprises slowly cooling the mass from the molten state without agitation to a temperature slightly above the eutectic point, removing those portions of the mass that are liquid at that temperature, slowly heating the remaining mass to a temperature below the melting point under the conditions obtaining of the pure alpha component and continuously removing those portions of the mass that are liquid during the heating stage.

16. The process of obtaining substantially pure alpha nitro naphthalene from a crude alpha nitro naphthalene mass containing some beta nitro naphthalene, the alpha component being present in excess of its proportion in a eutectic mixture of the two components, which comprises slowly cooling the mass from the molten state without agitation to a temperature of about 20° C., removing those portions of the mass that are liquid at that temperature, slowly heating the remaining mass to a temperature of about 50° C. and continuously removing those portions of the mass that are liquid during the heating stage.

17. The process of obtaining substantially pure alpha nitro naphthalene from a crude alpha nitro naphthalene mass containing some beta nitro naphthalene, the alpha component being present in excess of its proportion in a eutectic mixture of the two components, which comprises slowly cooling the mass from the molten state without agitation to a temperature slightly above the eutectic point, removing those portions of the mass that are liquid at that temperature by draining and by applying suction to the mass, slowly heating the remaining mass to a temperature below the melting point under the conditions for obtaining the pure alpha component and continuously removing those portions of the mass that are liquid during the heating stage.

18. The process of obtaining alpha mononitro naphthalene in substantially pure form from a mixture comprised mainly of alpha and beta mono-nitro naphthalenes and impurities and in which the alpha component is present in a higher than eutectic proportion, which comprises the steps of bringing the entire system to equilibrium at a temperature at which the greater part of the alpha component is present in solid phase while all of the beta component and impurities present are in liquid phase, separating by gravity the liquid phase from the solid, and recovering said solid phase substantially free from any adhering liquids containing the undesired components, the entire procedure being carried out under conditions excluding mechanical agitation.

19. The process of obtaining alpha naphthylamine in substantially pure form from a mixture comprised mainly of alpha and beta naphthylamines and impurities and in which the alpha component is present in higher than eutectic proportion, which comprises the steps of bringing the entire system to equilibrium at a temperature at which the greater part of the alpha component is present in solid phase while all of the beta component and impurities present are in liquid phase, separating by gravity the liquid phase from the solid, and recovering said solid phase substantially free from any adhering liquids containing the undesired components, the entire procedure being carried out under conditions excluding mechanical agitation.

In testimony whereof we have hereunto subscribed our names at Carrollville, Milwaukee County, Wisconsin.

HENRY J. WEILAND.
IVAN GUBELMANN.